United States Patent [19]

Boulloy et al.

[11] Patent Number: 4,907,130
[45] Date of Patent: Mar. 6, 1990

[54] METHOD FOR THE FABRICATION OF ALUMINIUM ELECTROLYTIC CAPACITORS, AND CAPACITOR WITH INTEGRATED ANODE OBTAINED THEREBY

[75] Inventors: Georges Boulloy, Dijon; François Delalande, St Pierre de Bresse, both of France

[73] Assignee: Compagnie Europeenne de Composants Electroniques - LCC, Courbevoie, France

[21] Appl. No.: 290,503

[22] Filed: Dec. 29, 1988

[30] Foreign Application Priority Data

Dec. 30, 1987 [FR] France ............................. 87 18374

[51] Int. Cl.⁴ .......................... B01J 17/00; H01G 9/08
[52] U.S. Cl. ..................................... 361/529; 29/25.03
[58] Field of Search ............... 29/570.1; 361/509, 510, 361/516, 517, 523, 525, 526, 528, 529, 533–540

[56] References Cited

U.S. PATENT DOCUMENTS

| | | | |
|---|---|---|---|
| 3,302,074 | 1/1967 | Black | 29/570.1 X |
| 3,424,952 | 1/1969 | Vierow | 29/570.1 X |
| 3,445,731 | 5/1969 | Saeki et al. | 361/529 |
| 3,679,944 | 7/1972 | Yoshimura et al. | 361/529 |
| 3,781,976 | 1/1974 | Tomiwa | 361/540 X |
| 3,872,358 | 3/1975 | Murakami et al. | 361/526 |
| 3,939,558 | 2/1976 | Riley | 29/627 |
| 3,949,279 | 4/1976 | Vierow | 361/529 |
| 3,986,869 | 10/1976 | Oishi et al. | 75/208 R |
| 4,090,288 | 5/1978 | Thompson et al. | 29/570.1 |
| 4,288,842 | 9/1981 | Voyles | 361/540 |
| 4,497,105 | 2/1985 | Uemura | 29/570.1 |

FOREIGN PATENT DOCUMENTS

| | | |
|---|---|---|
| 1521282 | 3/1968 | France . |
| 2494891 | 5/1982 | France . |
| 2567679 | 1/1986 | France . |
| 2602907 | 2/1988 | France . |
| 53412 | 4/1980 | Japan ............................. 29/570.1 |
| 2153148 | 8/1985 | United Kingdom . |

*Primary Examiner*—Donald A. Griffin
*Attorney, Agent, or Firm*—Oblon, Spivak, McClelland, Maier & Neustadt

[57] ABSTRACT

A method for the fabrication of aluminium electrolytic capacitors with solid or gelled liquid electrolyte, as well as the capacitor obtained by this method are disclosed. The method comprising the following steps:

the obtaining of a connections strip made of aluminium, having anode contacts, the fixing, to the anode contacts, of aluminium blocks either by sintering or by the spraying of molten aluminium, the anodization of the aluminium blocks;

the impregnation of the blocks with the electrolyte;

the positioning of the cathode contacts.

17 Claims, 3 Drawing Sheets

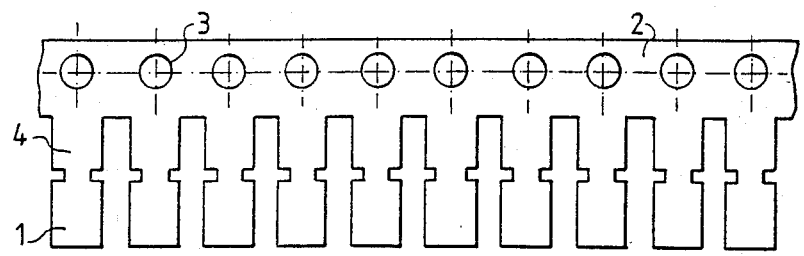
FIG.1
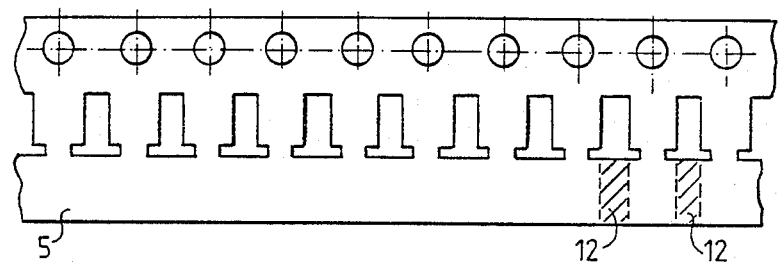
FIG.2
FIG.3
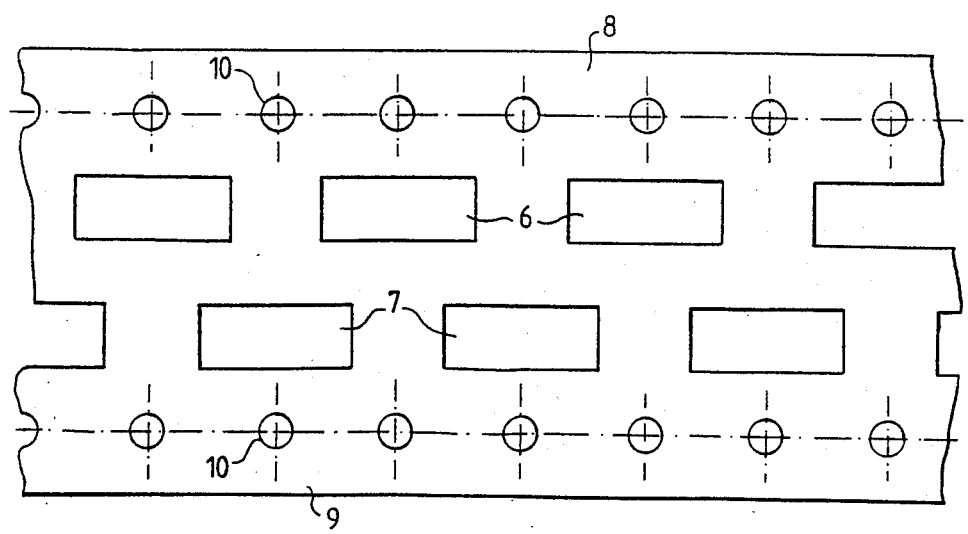

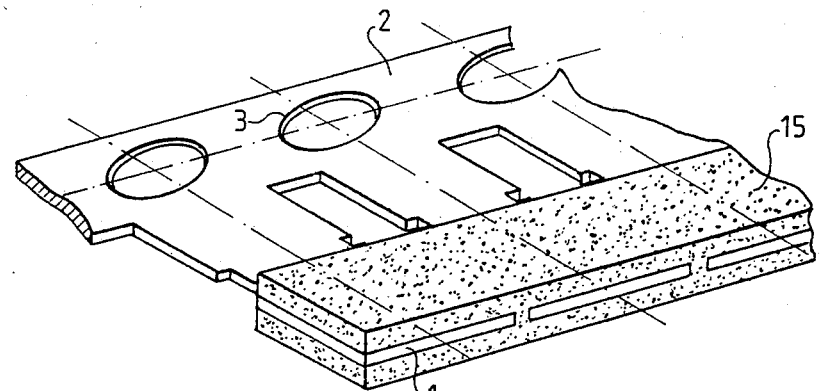
FIG. 4
FIG. 5
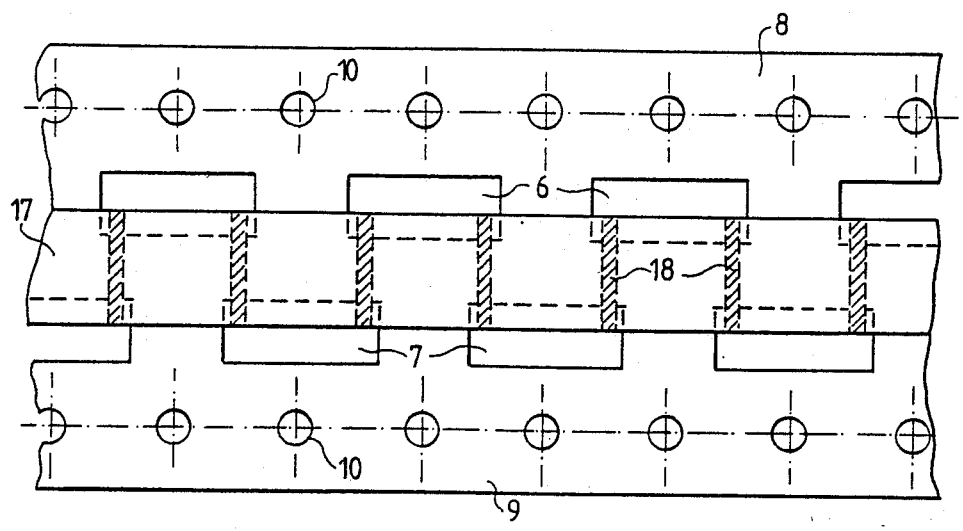

METHOD FOR THE FABRICATION OF ALUMINIUM ELECTROLYTIC CAPACITORS, AND CAPACITOR WITH INTEGRATED ANODE OBTAINED THEREBY

BACKGROUND OF THE INVENTION

1 Field of the Invention

An object of the present invention is a method for the fabrication of aluminium electrolytic capacitors with solid electrolyte or gelled liquid electrolyte, as well as capacitors obtained thereby.

2. Description of the Prior Art

Electrolytic capacitors are used above all because of their high capacity in a restricted volume. At present, there are three groups of low $C \times V$ product electrolytic capacitors on the market. There are aluminium capacitors with liquid electrolyte: the anode is made of aluminium and the cathode is an electrolytic liquid. There are also tantalum capacitors with solid electrolyte: the anode is made of tantalum and the cathode is a solid semiconductor electrolyte. Finally, there are aluminium capacitors with solid electrolyte: the anode is made of aluminium and the cathode is a solid semiconductor electrolyte.

The last-named group of electrolytic capacitors has recently seen undoubted development. The firm, Philips, has developed several ranges of aluminium electrolytic capacitors with solid electrolyte. The anode is made with a rolled or folded foil. The manufacturing method, using a foil anode, comprises the following steps:

the punching of an aluminium foil;
the etching of the foil;
folding of the etched aluminium foil in the case of radial capacitors, or rolling it up in the case of axial capacitors;
anodization of the foil to form a thin alumina layer;
formation of the solid electrolyte (manganese dioxide) by pyrolysis;
positioning of the cathode.

The method used to fabricate these capacitors is fairly complicated. It comprises a one-by-one folding operation in the case of radial capacitors or one-by-one rolling in the case of axial capacitors. The solid electrolyte forming stage is the most difficult one. Several cycles of pyrolysis (four in principle) are needed, and these cycles should occur under well-defined conditions of temperature and duration. These operations are very difficult to control. For, the basic product used is a very aggressive solution of manganese nitrate. The conversion into manganese dioxide should be very fast. A post-forming operation is needed to repair the alumina layer damaged by the nitrate.

To avoid at least a part of these difficult steps, the invention proposes a fabrication method which can be used to obtain aluminium electrolytic capacitors with solid or gelled liquid electrolyte, using aluminium blocks generated on the anode contacts either by sintering or by the spraying of molten metal. The invention also enables the use of an organic electrolyte instead of manganese dioxide.

SUMMARY OF THE INVENTION

An object of the invention, therefore, is a method for the fabrication of aluminium electrolytic capacitors with solid or gelled liquid electrolyte, said method comprising the following steps:

the obtaining of a connections strip made of aluminium, having anode contacts,
the fixing, to the anode contacts, of aluminium blocks either by sintering or by the spraying of molten aluminium,
the anodization of the aluminium blocks;
the impregnation of the blocks with said electrolyte;
the positioning of the cathode contacts.

Another object of the invention is an aluminium electrolytic capacitor with solid or gelled liquid electrolyte, formed by an aluminium block obtained by sintering or by the spraying of molten aluminium on an anode contact made of aluminium, said block being oxidized and coated with an electrolyte, a cathode contact being fixed to the electrolyte.

BRIEF DESCRIPTION OF THE DRAWINGS

The invention will be better understood, and other advantages will emerge, from the following description, which is given as a non-restrictive example, and from the appended figures, of which:

figures 1 to 3 show connections strips which can be used by the method according to the invention;

figures 4 and 5 illustrate the step for fixing the aluminium blocks on the connection strips;

DESCRIPTION OF PREFERRED EMBODIMENTS

Figure 6:
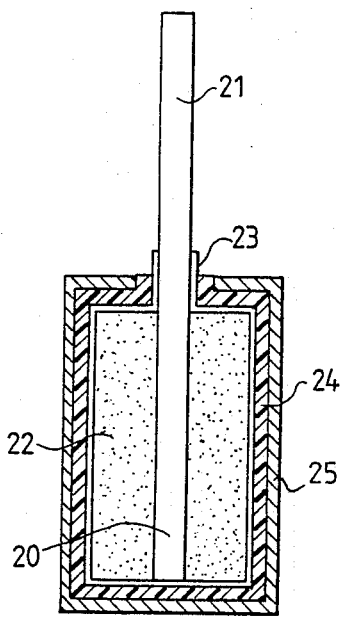
FIGS. 6 and 7 show capacitors, according to the invention, during the step for positioning the cathode contact.

According to the invention, the first step of the method consists in making a connections strip having anode contacts. The strip may be an aluminium strip, having parts of different natures, depending on the functions that these parts will have to fulfil. FIGS. 1, 2 and 3 illustrate three possible configurations of this connections strip.

The connections strip of FIG. 1 has a series of anode contacts 1, which are separated into individual contacts, connected to one another by a lateral zone 2 of the connections strip. It Is advantageous for the lateral zone 2 to be pierced with holes 3, which are evenly spaced out and will be used for its feed system, by means of a suitable device, in automated fabrication. That part of the connections strip which is formed by the anode contacts may or may not be etched. That part which is formed by the lateral zone 2 and the linking elements 4 between this lateral zone and the anode contacts may be copper-plated by electrochemical means and then tin-plated: this part should subsequently be capable of being soldered to a electronic circuit.

The connections strip of FIG. 2 differs from the previous one in that the anode contacts 5 are not separated into individual contacts. They will be separated into individual units in a subsequent step of the method. As above, and for the same reasons, the connections strip may have parts with natures that differ according to the functions to be fulfilled.

The connections strip of FIG. 3 differs from the previous ones in its two series of punched out portions, 6 and 7, which are offset with respect to each other, and also in the two lateral zones 8 and 9, pierced with feeding holes 10. As above, the lateral zones and the zone included between the punched out portions 6 and 7 may have different natures.

In the second step of the method, aluminium blocks are fixed to the anode contacts. These aluminium blocks may be arranged on a large active surface. This is what the etching operation, conventionally used in the fabrication of electrolytic capacitors, leads to. According to the invention, a large active surface is obtained either by sintering of aluminium or by spraying molten aluminium directly on the connections strip. The connections strip is then used as a joint face for the sintering or metal-spraying operation.

In the case of sintering, the sintering matrix may be made by applying a rectangular frame to the part corresponding to the anode contacts of the connections strip. The length of the frame is such that the matrix covers a number of anode contacts which is a whole number. The sintered aluminium may cover only one face of the anode contacts, but the sintering operation is advantageously performed on both faces of the anode contacts during one and the same operation.

For the spraying of molten aluminium, the same procedure may be used. The rectangular frame applied to one face of the anode contacts or to either side of these contacts will make it possible to clearly define the geometry of the mass of the sprayed metal. This spraying of metal may be obtained according to the known technique of Schoop's metal spraying process.

The sintering or metal spraying operations should be conducted under conditions that promote the growth of a large active surface. It is possible, notably for the sintering operation, to see to it that the aluminium gets superficially oxidized when the sintered material gets cooled.

The sintering or metal spraying operations create especially strong adhesion between the anode contacts and the mass of sintered or sprayed metal. It can then be said that the anodes are integrated with the mass of sintered or sprayed metal, even if this mass of metal coats only one side of the anodes.

FIG. 4 shows a connections strip of the type shown in FIG. 1, supporting an aluminium mass 15, obtained either by sintering or by the spraying of metal. To obtain separate, individual blocks, it suffices to cut out the aluminium mass between the anode contacts 1. This cutting out operation may be achieved, for example, by cutting with a circular saw or by means of an YAG laser.

If the connections strip shown in FIG. 2 is used, the cut-out portion should include also the connections strip along the hatched zones 12 to the anode contacts into individual units.

It is also possible to obtain individual blocks directly, by sintering or metal spraying, with a matrix having cells at the rate of one cell per anode contact. In this case, the use of a connections strip of the type shown in FIG. 1 would remove the need for an operation to cut the mass out into blocks. Moreover, if the aluminum blocks are obtained by a sintering operation, under conditions that promote the surface oxidization of the metal, it would be possible to do away with the next step of the procedure which consists, precisely, in the oxidizing of the aluminum blocks.

If a connections strip of the type shown in FIG. 3 is used, the aluminium mass 17 will be deposited in the middle of the connections strip as shown in FIG. 5, on one face or on both faces of this strip. Cuts will then be made along the hatched zones 18, and then two separate connection strips will be obtained, each having a lateral zone pierced with holes for a feed system.

For example, the thickness of the aluminum mass deposited may be 1 to 10 mm. and each of the sides of the blocks may be about 4.5 mm. long.

Then following step of the procedure consists in the anodizing (oxidization) of the blocks obtained. This step can be performed in a standard way by means of a reforming bath. That part of the connections strip, which does not include the anode contacts, can be kept outside the solution. Since the oxidization occurs after the element is cut out into blocks, there is no need to reform the oxide layer unlike the case in joint fabrication methods of the prior art.

The etched and oxidized blocks then undergo an impregnating operation which enables the positioning of the electrolyte. The metallic strip may be also used to perform this operation efficiently, in supporting the blocks in such a way that the non-oxidized parts of the blocks are not impregnated.

Several electrolytes may be used, in remaining within the scope of the invention. It is also possible to use tetracyanoquinodimethane (TCNQ) salts, for example N-(n-butyl)isoquinolinium TCNQ. This product may be put into solution in a solvent (lactone, acetonitrile etc.). The blocks are then steeped in the solution. After evaporation of the solvent, the oxidized blocks are found to be coated with electrolyte. The impregnation can also be achieved with electrolyte in molten phase. In the case of N-(n-butyl)isoquinolinium TCNQ, the temperature of this phase will preferably be chosen between 240° and 290° C.

Other organic or inorganic electrolytes may be used, for example manganese dioxide, for which the impregnation can be done, in a manner known per se , by pyrolysis.

Again, a gelled liquid electrolyte may be used.

The impregnation of the blocks makes it possible to obtain, after solidification or gelling of the electrolyte, electrolytic capacitors between the anode contacts and cathode contacts to be fixed to the mass of the electrolyte.

To achieve the impregnating operation, the blocks may be heated by different means: by conduction through the connection strip, by infrared radiation or by induction (high frequency, eddy currents).

In the next step, the cathode contacts are positioned. Various approaches are possible for this positioning. They depend on the final design chosen.

Cathode contacts can be implanted (made of tin-plated copper for example), at the end of the impregnation by an organic electrolyte, the electrolyte being still liquid enough to adhere to the contacts. It is also possible, after the impregnating operation, to deposit a conductive resin on the electrolyte, for example of the silver-charged epoxide type, at the same time as the cathode contacts are positioned. A metal (aluminium for example) can also be deposited by Schoop's metal spraying process.

It may be necessary, to improve the electrical conductivity between the cathode formed by the electrolyte and the cathode contact, to pass the blocks through a graphite bath and to then coat them with a metallization (silver coating for example). The lateral zone of the connections strip is then used to carry the blocks while these operations are being performed. FIG. 6 shows, in a section made perpendicularly to the connections strip, the structure of a capacitor at this stage of the method. The central part is formed by the anode contact 20, extended by a part 21, which remains from the connections strip and is integrated in the aluminium block 22. The layer 23 corresponds to aluminium oxide obtained during the anodization step. The layer 24 corresponds to the impregnating electrolyte. This layer 24 should not go beyond the oxide layer 23 so as not to short-circuit the anode to the cathode. The layer 25, coating the electrolyte 24, is formed by graphite covered with a metallization.

Figure 7:
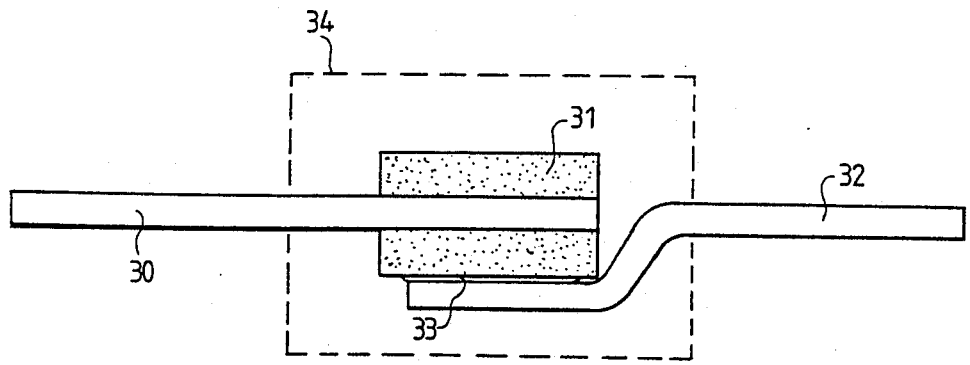

The cathode contacts may form part of a connections strip similar to the one used for the anodes. For example, and to have contacts that emerge symmetrically with the capacitor block, the connections strip of the cathodes, when seen in profile, may have the shape shown in FIG. 7. This figure shows: an anode connections strip 30 with its ends integrated into the aluminium blocks 31 and a cathode connections strip 32 to provide for the electrical contacts with the electrolyte. In this example, the cathode contacts adhere to the impregnated blocks by means of a layer of conductive bonder 33. The line 34, made with dashes, demarcates the overmolding material used to surround the components. The connection strips will be used here as joint faces. In the overmolded material, the punched out parts in the connections strips could be folded back to obtain anode electrodes and cathode electrodes and thus provide SMC (surface mounted components) type components.

What is claimed is:

1. A method for the fabrication of an aluminum electrolytic capacitor with a solid or gelled liquid electrolyte, comprising the steps of:
   obtaining an aluminum connection strip, said strip having anode contacts,
   fixing to the anode contacts, aluminum blocks by sintering or by the spraying of molten aluminum,
   anodizing said aluminum blocks;
   impregnating said blocks with said electrolyte; and
   electrically connecting cathode contacts to said electrolyte.

2. The method according to claim 1, wherein the aluminium blocks are obtained by being cut out of a mass of aluminium fixed to several anode contacts.

3. The method according to claim 1 wherein, with the connections strip having previously punched out anode contacts, the aluminium blocks are obtained by the fixing of aluminium blocks to the anode contacts at the rate of one block per anode contact.

4. The method according to claim 1, wherein the aluminium blocks are fixed to the anode contacts so as to coat their main faces.

5. The method according to claim 1, wherein the aluminium is fixed to the connections strip under conditions, that promote its surface oxidization.

6. The method according to claim 1, wherein the impregnating operation is performed by steeping the blocks in a solution containing an organic electrolyte and by evaporation of the solvent of the solution.

7. The method according to claim 6, wherein the cathode contacts are fixed to the electrolyte at the end of the impregnation operation.

8. The method according to claim 1, wherein the impregnating operation is performed with an organic electrolyte in molten phase.

9. The method according to claim 1, wherein the impregnation operation is performed by pyrolysis.

10. A method according to claim 1, wherein the cathode contacts are fixed to the electrolyte by means of a resin or a conductive bonder.

11. A method according to claim 1, wherein the cathode contacts are fixed to the electrolyte by Schoop's metal spraying process.

12. An aluminum electrolyte capacitor with a solid or gelled electrolyte, comprising:
    an aluminum anode contact,
    aluminum blocks attached to opposing sides of said anode, the surface of said blocks being anodized,
    a coating of electrolyte on said blocks, and
    a cathode contact electrically connected to said electrolyte.

13. The capacitor according to claim 12, wherein the aluminium block coats both the main faces of the anode contact.

14. The capacitor according to claim 12, wherein the electrolyte used is an organic electrolyte.

15. The capacitor according to claim 14, wherein the said electrolyte is a tetracyanoquinodimethane salt.

16. A capacitor according to claim 15, wherein said salt is the N-(n-butyl)isoquinolinium tetracyanoquinodimethane.

17. A capacitor according to claim 12, wherein the electrolyte used is manganese dioxide.

* * * * *